Jan. 5, 1932.   D. E. GAMBLE   1,839,959
FRICTION CLUTCH
Filed Sept. 3, 1929   2 Sheets-Sheet 1
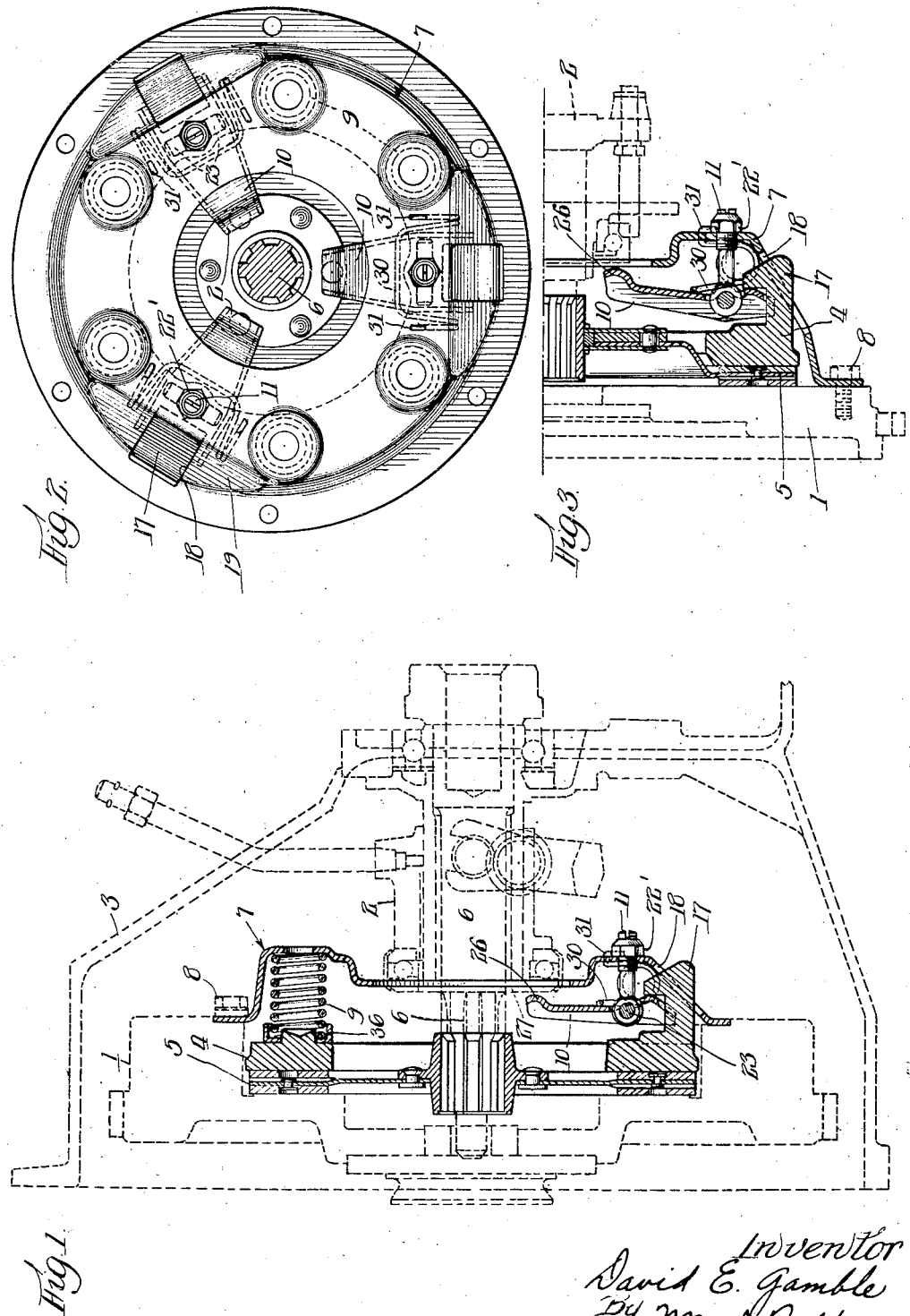

Jan. 5, 1932.  D. E. GAMBLE  1,839,959
FRICTION CLUTCH
Filed Sept. 3, 1929   2 Sheets-Sheet 2
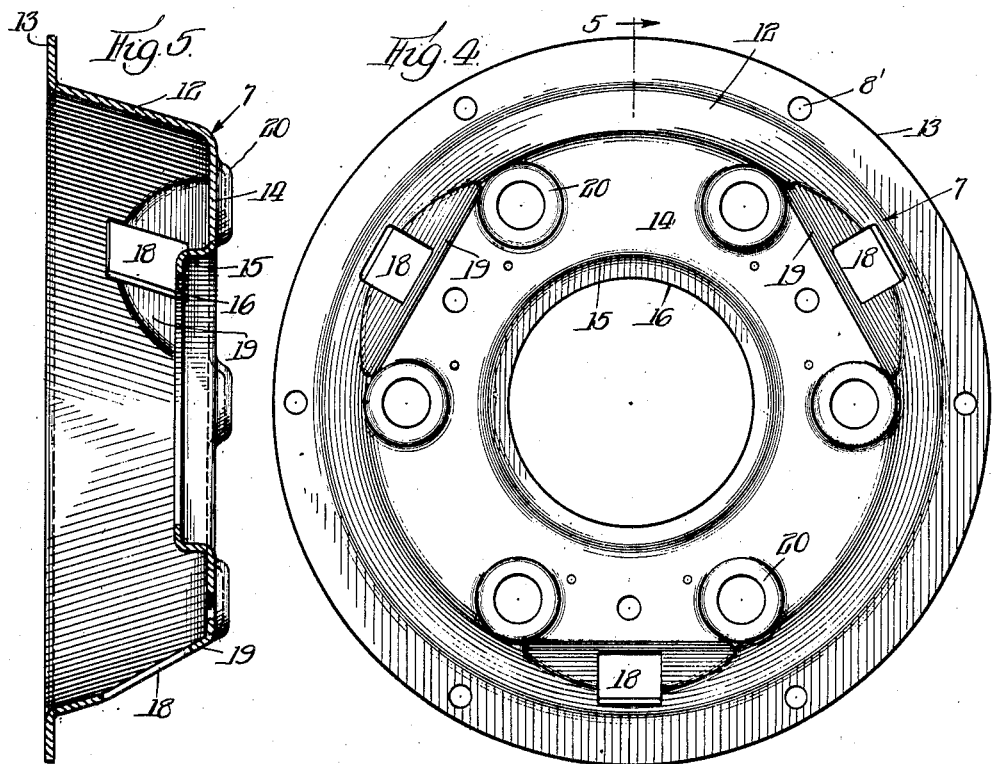
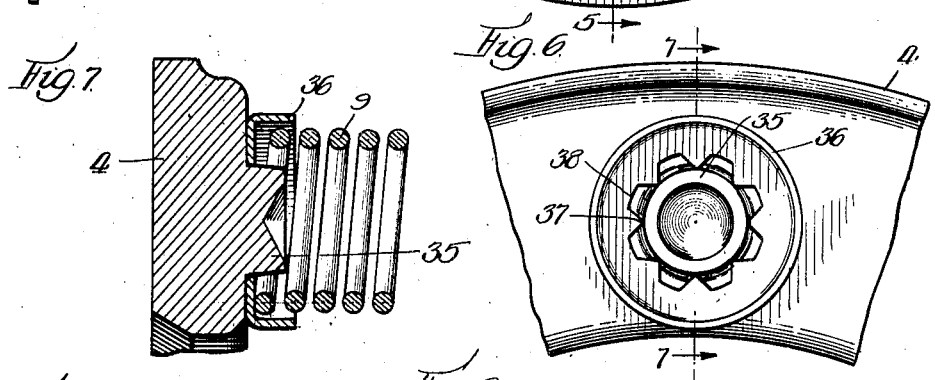
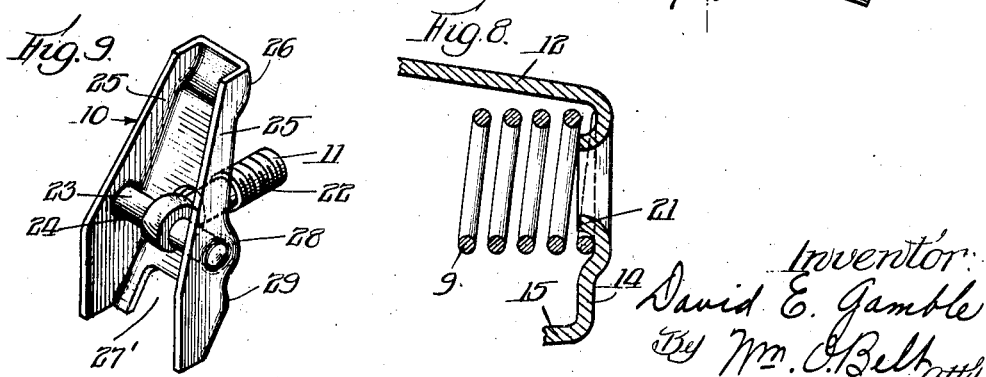
Inventor
David E. Gamble
By Wm. C. Belt atty.

Patented Jan. 5, 1932

1,839,959

UNITED STATES PATENT OFFICE

DAVID E. GAMBLE, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Application filed September 3, 1929. Serial No. 389,962.

This invention relates to friction clutches of the type which are adapted primarily but not exclusively for use in automotive vehicles.

One of the objects of the invention is to make as many as possible of the parts of a friction clutch by stamping to reduce the cost and expedite the manufacture, and also to distribute the weight of the clutch in an efficient manner to obtain best results in service.

Other objects of the invention are to provide a friction clutch with a stamped cover of novel and substantial construction which will not yield objectionably during the action of the clutch, and which can be easily made and installed in operative position; to provide stamped clutch levers of simple but rigid construction, and novel means for supporting the levers in the clutch assembly; to provide a relatively light weight clutch of strong and substantial structure adapted for efficient operation in automotive vehicles and other installations; and to provide a clutch comprising relatively few parts of simple but strong and rigid construction adapted to be easily assembled compactly in position for use; and to provide a novel mounting for the pressure springs to insure a circulation of air between the pressure plate and the springs and to protect the springs from heat from the pressure ring.

In the accompanying drawings illustrating a selected embodiment of the invention, Fig. 1 is a sectional elevation showing my improved clutch in full lines and associated parts in broken lines.

Fig. 2 is a plan elevation of the clutch looking at the outside of the cover.

Fig. 3 is a sectional view showing the clutch applied to another type of flywheel.

Fig. 4 is an enlarged elevation of the cover.

Fig. 5 is a sectional view of the cover on the line 5—5 of Fig. 4.

Fig. 6 is an enlarged detail view showing the insulated spring seat on the pressure plate.

Fig. 7 is a sectional view on the line 7—7 of Fig. 6.

Fig. 8 is a detail sectional view showing another form of spring seat on the cover.

Fig. 9 is a detail perspective view of a clutch lever with its eyebolt.

Referring to the drawings 1 is a flywheel rigidly mounted on a driving shaft (not shown), 2 is a clutch release device operating on the driven shaft and 3 is a housing enclosing the clutch and its associated parts. A pressure plate 4 is arranged for bodily movement to clamp a clutch plate 5 between itself and the flywheel whereby to impart motion from the driving shaft and flywheel through the pressure plate to the driven shaft 6 on which the pressure plate is mounted. It will not be necessary to describe a clutch plate of particular construction because my invention may be used with clutch plates of many different kinds. A cover 7 is fastened to the flywheel by bolts 8. Springs 9 are interposed between the pressure plate and the cover for normally clamping the clutch plate in operative engagement with the flywheel and clutch levers 10 are pivotally mounted on eyebolts 11 supported in the cover and adapted to be operated by the clutch release device 2 to retract the pressure plate against the tension of springs 9 and release the clutch. The cover is a sheet metal stamping of the general shape of the frustum of a cone, as shown in Figs. 4 and 5, having a tapered and substantially circular side 12, with an outwardly projecting peripheral flange 13 at its larger inner end and an inwardly projecting annular flange 14 at its smaller outer end. The flange 13 is provided with holes 8' to receive the bolts 8 which secure the cover to the flywheel. The inner edge of the flange 14 is depressed to form a collar 15 substantially parallel with the axis of the cover and the inner edge of this collar is bent inwardly to form a flange 16 substantially concentric with the flange 13. The pressure plate has a boss 17 made in the form of an inwardly directed hook for each lever 10 and the cover has an opening 18 in its side to receive each boss and the side is flattened at 19 adjacent each opening. Since the cover 7 is bolted to the flywheel and the bosses 17 engage the openings 18 in the cover with a fair snug fit the pressure plate 4 is driven from the flywheel and revolves therewith. The flange 14 on the cover has embossed seats 20 to receive the outer ends of the springs 9, Figs. 4, 5. Instead of embossing the seats to project outwardly on the flange 14 of the cover as shown in Figs. 4 and 5, I may bend the metal inward as at 21, Fig. 8. The general shape of the cover and the various structural features thereof all contribute to the strength and rigidity of the plate which enables it to be made of comparatively light sheet metal by stamping. The tapered side 12, the collar 15 and flange 16, the flat sections 19 and the spring seats all contribute to the strength and rigidity of the cover. The bolt 11 has a threaded portion 22 to receive the nut 22' which bears upon the outer face of the flange 14 of the cover and may be operated to adjust the bolt for changing the position of the fulcrum of the lever 10 as may be required. A pin 23 passes through the eye 24 of the bolt 11 and forms a fulcrum for the lever 10, Fig. 9. The lever is a sheet metal stamping and it has substantially parallel sides 25 for strength. The inner end of the lever is rounded at 26 to engage the bearing 27 of the clutch release device, Fig. 1. The outer end of the lever is recessed at 27' to receive the boss 17, Fig. 1, whereby the lever is prevented from swinging laterally and is always maintained in proper radial position to the pressure plate. The lever is bent at 28 to accommodate the pin 23 and it is rounded or humped at 29 to engage the hook of the boss 17. The tail or bifurcated outer end of the lever is directed angularly away from the hump 29 to engage the boss without interfering with the bearing of the lever on the hook thereof. A spring 30 has its ends 31 hooked to the cover and engages the lever between its inner end and the fulcrum to hold the inner end 26 of the lever away from the bearing 27 when the clutch is engaged and to hold the lever in constant engagement with the boss, to prevent chatter. By operating the nuts 22' the position of the fulcrum and the levers can be accurately adjusted for conjoint action to release the pressure plate quickly and in a plane parallel with the axis of the driven shaft and to control the clamping movement of the pressure plate in the same manner. The bolt 11 and its lever are supported on the cover with the outer end or tail of the lever held in operative contact with the hooked boss by the spring 30. The engagement of the pivot pin 23 with the eye of the bolt prevents the lever from pivoting laterally on the bolt and the engagement of the tail of the lever with the boss prevents lateral movement of the lever, whereby the lever is constantly maintained in radial position in the boss. The pressure plate is provided with a stud 35, Fig. 7, for each spring 9 and this stud is tapered and receives a cap 36. This cap has a plurality of inwardly directed points 37 to engage the stud for centering and holding the cap on the stud, and between the points the cap is recessed at 38 for a substantial distance from the points. Thus the only contact between the cap and the stud is at the points and very little heat will flow from the pressure plate through these points to the cap and spring which engages the cap outside of the pointed and recessed portion thereof. The stud is an integral unfinished part of the casting forming the pressure plate, and the points 37 adapt themselves to the stud to overcome any irregularities or inequalities in the size and shape of the stud. This enables the cap to be easily centered on the stud to receive the spring. The novel construction of my improved clutch enables it to be made largely of sheet metal stampings and still have the required rigidity of parts and flexibility of action necessary for an automotive clutch. Furthermore, provision is made for holding the movable parts so that they will not chatter while the clutch is in use but without interfering with the freedom of movement of these parts as required in the operation of the clutch. In Fig. 3 I have shown the invention embodied in a clutch assembly in which the flywheel and the clutch plate and the release devices differ slightly in construction from corresponding parts shown in Fig. 1 but this is merely to illustrate the adaptability of the invention for clutches of different constructions.

Changes may be made in the form, construction and arrangement of parts of my invention as may be found to be necessary or desirable to adapt it for different clutches or for other purposes and I reserve the right to make all such changes within the scope of the following claims:

I claim:

1. In a friction clutch of the character described, a stamped sheet metal cover made in the form of a frustum of a cone and having an inwardly directed annular flange at one end, the side of the cone having spaced flattened sections.

2. In a friction clutch of the character described, a stamped sheet metal cover made in the form of a frustum of a cone and having an inwardly directed annular flange at one end, the side of the cone having spaced openings therein and flattened sections adjacent said openings.

3. In a friction clutch of the character described, a stamped sheet metal cover made in the form of a frustum of a cone and having an inwardly directed annular flange at one end, the outer peripheral edge of said flange having spaced flat sections.

4. In a friction clutch of the character described, a cover adapted to be secured to a flywheel, a pressure plate engaged with the cover to revolve therewith, eyebolts mounted on the cover and projecting inwardly therefrom, pins mounted in said eyebolts, and clutch release levers mounted on said pins and engaging said pressure plate.

5. In a friction clutch of the character described, a cover adapted to be secured to a flywheel, a pressure plate engaged with the cover to revolve therewith and having hook-shaped bosses, eyebolts mounted on said cover, pivot pins supported in said eyebolts, and clutch release levers fulcrumed on said pins and engaging said bosses.

6. In a friction clutch of the character described, a cover adapted to be secured to a flywheel and having openings therein, a pressure plate, bosses on the periphery of the plate engaged with said openings in the cover to revolve therewith, radially disposed levers pivotally supported from the cover, and interengaging means between the outer ends of said levers and the pressure plate to prevent movement of the levers out of their radial position.

7. In a friction clutch of the character described, a stamped sheet metal clutch lever having a bifurcated outer end to engage a pressure plate, a rounded nose at its inner end to engage a clutch release device, a hump to engage the pressure plate, and strengthening side walls.

8. In a friction clutch of the character described, a pressure plate having a stud thereon, a cover, a spring centering cap having an opening to receive the stud whereby said stud may project through said opening beyond said cap, said cap having a plurality of point contacts with the stud, and a spring between the cap and the cover.

9. In a friction clutch of the character described, a pressure plate having a stud thereon, a cover, a spring between the plate and cover, and a cap on the end of the spring and having pointed projections between the spring and plate and engaging the stud.

10. In a friction clutch of the character described, a pressure plate having a stud thereon, a cover, a spring centering cap, and a spring between the cap and the cover, said cap having a plurality of point contacts with the stud and engaging the end of the spring adjacent the plate and projecting along the spring on the outside thereof.

DAVID E. GAMBLE.